(12) United States Patent
Matsuzaki

(10) Patent No.: US 7,778,117 B2
(45) Date of Patent: Aug. 17, 2010

(54) TIME ADJUSTMENT DEVICE, TIMEKEEPING DEVICE WITH A TIME ADJUSTMENT DEVICE, AND A TIME ADJUSTMENT METHOD

(75) Inventor: Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 18 days.

(21) Appl. No.: 12/171,104

(22) Filed: Jul. 10, 2008

(65) Prior Publication Data
US 2009/0034371 A1    Feb. 5, 2009

(30) Foreign Application Priority Data
Jul. 31, 2007    (JP) .............................. 2007-199091

(51) Int. Cl.
*G04C 11/02* (2006.01)
(52) U.S. Cl. .......................................... 368/47; 368/46
(58) Field of Classification Search .................... 368/47
See application file for complete search history.

(56) References Cited

U.S. PATENT DOCUMENTS 5,666,122 A * 9/1997 Carter ................... 342/357.15
6,559,796 B1    5/2003 Huber et al.
7,613,258 B2 * 11/2009 Yu et al. ................. 342/357.15
2004/0233789 A1 * 11/2004 Oguchi et al. ................. 368/47
2005/0157592 A1 * 7/2005 Nakamura .................... 368/47

FOREIGN PATENT DOCUMENTS

| EP | 0 436 854 A2 | 7/1991 |
| JP | 10010251 | 1/1998 |
| WO | 96/02092 | 1/1996 |

* cited by examiner

*Primary Examiner*—Vit W Miska
*Assistant Examiner*—Jason Collins

(57) ABSTRACT

A time adjustment device having a satellite signal reception unit that receives satellite signals containing satellite time information transmitted from a positioning information satellite; a time information generating unit that generates time information; and a time information adjustment unit that adjusts the time information based on the satellite time information received by the satellite signal reception unit. The satellite signal reception unit includes a positioning information satellite selection unit that selects the positioning information satellite from which the satellite time information is received; and the positioning information satellite selection unit selects a positioning information satellite based on variation in the transmission frequency of the satellite signal transmitted from the positioning information satellite.

5 Claims, 11 Drawing Sheets

TIME ADJUSTMENT DEVICE, TIMEKEEPING DEVICE WITH A TIME ADJUSTMENT DEVICE, AND A TIME ADJUSTMENT METHOD

CROSS-REFERENCE TO RELATED APPLICATION

Japanese Patent application No. 2007-199091 is hereby incorporated by reference in its entirety.

BACKGROUND

1. Field of Invention

The present invention relates to a time adjustment device that corrects the time based on signals from a positioning information satellite such as a GPS satellite, to a timekeeping device that has the time adjustment device, and to a time adjustment method.

2. Description of Related Art

The Global Positioning System (GPS) for determining the position of a GPS receiver uses GPS satellites that circle the Earth on known orbits, and each GPS satellite has an atomic clock on board. Each GPS satellite therefore keeps the time (referred to below as the GPS time) with extremely high precision.

A GPS receiver that receives signals from GPS satellites must receive the TOW (Time Of Week) signal contained in the signals from a GPS satellite in order to get the time information transmitted by the GPS satellite. The TOW signal is the GPS time, and more specifically is the number of seconds from the beginning of each week. See, for example, Japanese Unexamined Patent Appl. Pub. JP-A-H10-10251.

In order to receive signals from the GPS satellites and adjust the time based thereon, the signals from the GPS satellites must be received without passing through obstructions. If the receiver is located inside a building, however, the building itself is an obstruction and the satellite signal must be received through a window.

When the satellite signal is received through a window, the signals can be more efficiently received if the receiver selects a GPS satellite at a low angle of elevation.

Whether the elevation angle of a satellite is low or not is only known to the receiver after the almanac data containing the GPS satellite orbit information is acquired, and the receiver must therefore first acquire the almanac data.

The almanac data containing the GPS satellite orbit information is updated periodically, however, and after the almanac data is updated the receiver must again receive the GPS satellite almanac data and update the internally stored copy of the almanac data.

Furthermore, because the almanac data contains orbit information for all GPS satellites in the constellation, the receiver requires a relatively long period of time to acquire the full almanac, and power consumption by the receiver is therefore high.

High current consumption not only shortens how long the receiver can operate on a single battery charge, it also limits the batteries that the receiver can use.

SUMMARY OF INVENTION

A time adjustment device, a timekeeping device with a time adjustment device, and a time adjustment method according to the present invention enable selecting a positioning information satellite needed for efficient reception without acquiring, for example, orbit information from the positioning information satellite, while also reducing power consumption.

A first aspect of the invention is a time adjustment device having a satellite signal reception unit that receives satellite signals containing satellite time information transmitted from a positioning information satellite; a time information generating unit that generates time information; and a time information adjustment unit that adjusts the time information based on the satellite time information received by the satellite signal reception unit. The satellite signal reception unit includes a positioning information satellite selection unit that selects the positioning information satellite from which the satellite time information is received; and the positioning information satellite selection unit selects a positioning information satellite based on variation in the transmission frequency of the satellite signal transmitted from the positioning information satellite.

In this aspect of the invention the positioning information satellite selection unit selects a positioning information satellite based on variation in the transmission frequency of the satellite signal transmitted from the positioning information satellite. This variation in the transmission frequency of the satellite signal includes Doppler shift.

The Doppler shift expresses the difference between the theoretical and the apparent transmission frequency of the satellite signal, and where there is no difference, which is when the Doppler shift is 0 kHz, the positioning information satellite is at its zenith directly above the time adjustment device. As the difference increases to 1 kHz to 2 kHz, the positioning information satellite is moving gradually to a position at a lower angle of elevation.

Based on the transmission frequency of the satellite signal, the positioning information satellite selection unit can therefore determine the elevation angle of the positioning information satellite, recognize the position of the positioning information satellite from the elevation angle, and select a desirable satellite for signal reception. Yet more specifically, the positioning information satellite selection unit does not need to acquire the almanac data containing orbit information for all of the positioning information satellites in order to get positional information for the positioning information satellites, and can quickly acquire a satellite signal.

In addition, the time adjustment device also features extremely low power consumption because receiving satellite signals from a positioning information satellite for an extended time in order to acquire the almanac data is not necessary.

In a time adjustment device according to another aspect of the invention the transmission frequency variation information is theoretical transmission frequency difference information, and the positioning information satellite selection unit preferentially selects a positioning information satellite for which the difference to the theoretical value of the transmission frequency is small.

In this aspect of the invention the transmission frequency variation information is theoretical transmission frequency difference information, and the positioning information satellite selection unit preferentially selects a positioning information satellite for which the difference to the theoretical value of the transmission frequency is small.

In this aspect of the invention the transmission frequency variation information is the difference to the theoretical transmission frequency, and the positioning information satellite selection unit preferentially selects a positioning information satellite for which the difference to the theoretical value of the transmission frequency is small, that is, a positioning information satellite located near the zenith at a high elevation angle.

The time adjustment device can thus select a positioning information satellite located at a position affording good reception, and the satellite signals transmitted thereby can therefore be efficiently received.

In a time adjustment device according to another aspect of the invention the theoretical transmission frequency difference information includes approaching frequency difference information for positioning information satellites that are moving closer to and receding frequency difference information for positioning information satellites that are moving away from the time adjustment device, and the positioning information satellite selection unit scans for satellite signals by alternating between the approaching frequency difference information and the receding frequency difference information and/or with preference for the approaching frequency difference information over the receding frequency difference information.

In this aspect of the invention the positioning information satellite selection unit scans for satellite signals by alternating between the approaching frequency difference information and the receding frequency difference information and/or with preference for the approaching frequency difference information over the receding frequency difference information.

More specifically, the approaching frequency difference information indicates a positioning information satellite is moving toward the zenith, and the receding frequency difference information indicates a positioning information satellite is moving away from the zenith.

The time adjustment device in this aspect of the invention can therefore search for positioning information satellites that are moving toward the zenith and for positioning information satellites that are moving away from the zenith when scanning frequencies to receive the satellite signal from a satellite signal, and can therefore search effectively.

In addition, satellite signals indicated by the approaching frequency difference information for a positioning information satellite approaching the zenith are satellite signals that are better suited to reception than satellite signals identified by the receding frequency difference information.

The time information can therefore be more quickly and accurately received by frequency scanning for approaching frequency difference information preferentially to receding frequency difference information, and preferentially receiving satellite signals from the positioning information satellite at this frequency.

In a time adjustment device according to another aspect of the invention the transmission frequency variation information is the size of the frequency variation, and the positioning information satellite selection unit preferentially selects a positioning information satellite for which the frequency variation is great.

In this aspect of the invention the transmission frequency variation information is the size of the frequency variation, and the positioning information satellite selection unit preferentially selects a positioning information satellite for which the frequency variation is great. This transmission frequency variation information is, for example, Doppler shift variation information. Variation in the Doppler shift is not sudden but is rather gradual at a low elevation angle. At a high elevation angle, however, change in the Doppler shift is abrupt.

Therefore, if the positioning information satellite selection unit selects a positioning information satellite in a range with a large frequency variation, a positioning information satellite at a high elevation angle, that is, a positioning information satellite that is approaching the zenith, can be effectively selected, and the time adjustment device can receive the satellite signals more accurately.

More particularly, if the time adjustment device attempts to receive signals in a specific frequency range in a high elevation angle range but the frequency output of the internal crystal oscillator contains error, it may not be possible to select a satellite signal in the desired range and receiving the satellite signal may therefore not be possible.

However, this aspect of the invention can select a positioning information satellite at a higher elevation angle, that is, closer to the zenith, regardless of the frequency range, and can therefore desirably select a more suitable positioning information satellite.

A time adjustment device according to another aspect of the invention preferably also has a reception range information storage unit that stores reception range information defining the reception range for receiving positioning information satellite signals based on a difference in time adjustment device environment information. The positioning information satellite selection unit selects a positioning information satellite based on this reception range information.

This aspect of the invention also has a reception range information storage unit that stores reception range information defining the reception range for receiving positioning information satellite signals based on a difference in time adjustment device environment information. The positioning information satellite selection unit selects a positioning information satellite based on this reception range information.

If the time adjustment device is indoors, for example, this reception range information sets an elevation angle range of 30° to 60°, and if outdoors, the reception range information sets an elevation angle range of 0° to 30°. When indoors the satellite signal is preferably received through a window, for example, and the elevation angle is therefore preferably low. When outdoors, however, a high elevation angle range near the zenith is preferable because satellite signals can be received more accurately and efficiently.

In this aspect of the invention the positioning information satellite selection unit frequency scans for positioning information satellites at an elevation angle of 30° to 60° when the time adjustment device is indoors to select an optimal positioning information satellite for receiving the time information.

When the time adjustment device is outdoors, however, an elevation angle range of 0° to 30° is frequency scanned to select the optimal positioning information satellite and receive the time information.

Further preferably, the reception range information includes indoor reception range information defining the frequency range to scan when the time adjustment device is indoors, and outdoor reception range information defining the frequency range to scan when the time adjustment device is outdoors, and the time adjustment device also has an indoor/outdoor determination unit that decides if the time adjustment device is indoors or outdoors.

Yet further preferably, the indoor/outdoor determination unit decides if the time adjustment device is indoors or outdoors based on the power generated by photoelectric conversion.

Because the indoor/outdoor determination unit decides if the time adjustment device is indoors or outdoors based on the power generated by photoelectric conversion, whether the time adjustment device is indoors or outdoors can be easily and reliably decided.

Another aspect of the invention is a timekeeping device with a time adjustment device, including a satellite signal reception unit that receives satellite signals containing satellite time information transmitted from a positioning information satellite; a time information generating unit that generates time information; and a time information adjustment unit that adjusts the time information based on the satellite time information received by the satellite signal reception unit. The satellite signal reception unit includes a positioning information satellite selection unit that selects the positioning information satellite from which the satellite time information is received, and the positioning information satellite selection unit selects a positioning information satellite based on variation in the transmission frequency of the satellite signal transmitted from the positioning information satellite.

Yet another aspect of the invention is a time adjustment method including a satellite signal reception step in which a satellite signal reception unit receives satellite signals containing satellite time information transmitted from a positioning information satellite; and a time information adjustment step that adjusts the time information of a time information generating unit based on the satellite time information received by the satellite signal reception unit; wherein a positioning information satellite selection unit selects the positioning information satellite from which the satellite signal reception unit is to receive the satellite time information, and selects the positioning information satellite based on variation in the transmission frequency of the satellite signal transmitted from the positioning information satellite.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures. Note that the following embodiments are preferred specific implementations of the invention and therefore describe some technically preferred limitations, but the scope of the invention is not limited thereto unless specifically stated as required by the invention.

Embodiment 1

Figure 1:
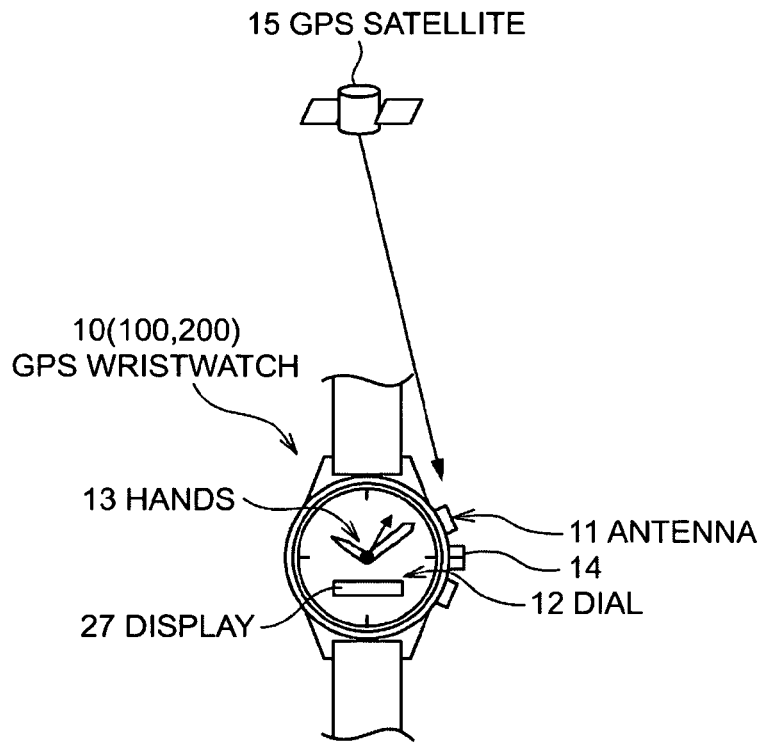
FIG. 1 is a schematic diagram of a wristwatch with a GPS time adjustment device as an example of a timekeeping device with a time adjustment device according to the present invention.
Figure 2:
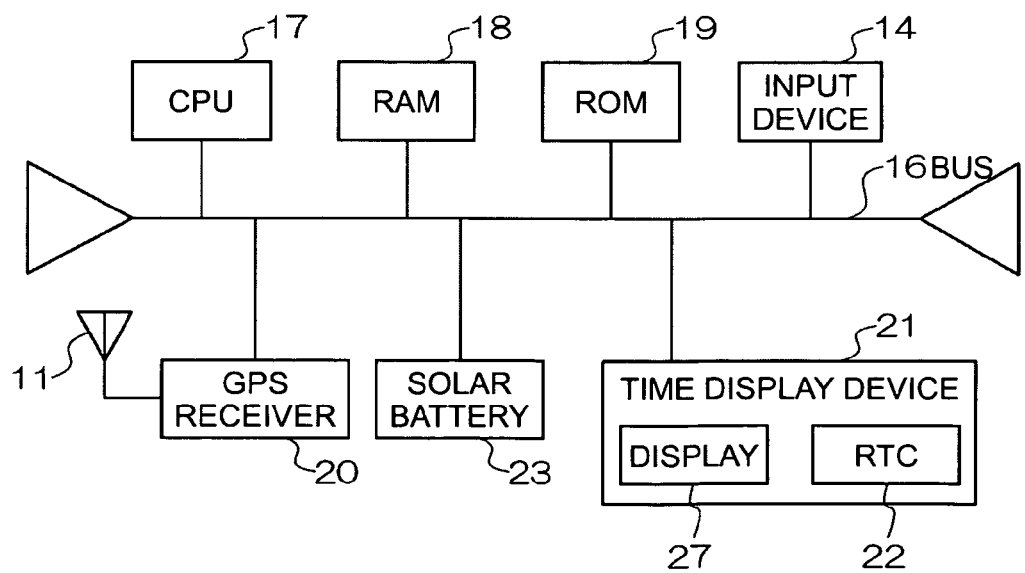
FIG. 2 is a block diagram of the main internal hardware arrangement of the wristwatch with GPS receiver shown in FIG. 1.

FIG. 1 shows a wristwatch with a GPS time adjustment device 10 (referred to herein as a GPS wristwatch 10) as an example of a timekeeping device with a time adjustment device according to the present invention. FIG. 2 is a block diagram of the main internal hardware arrangement of the GPS wristwatch 10 shown in FIG. 1.

As shown in FIG. 1, the GPS wristwatch 10 has a dial 12 with hands 13 including a long hand and a short hand on the face, and a display 27 such as an LED display for presenting information and messages. The display 27 is not limited to an LED device and could be an LCD or an analog display.

The GPS wristwatch 10 also has an input device 14 enabling the user to input instructions.

As also shown in FIG. 1 the GPS wristwatch 10 also has an antenna 11. This antenna 11 is used for receiving signals from a GPS satellite 15 circling the Earth on a fixed orbit in space. The GPS satellite 15 is an example of a positioning information satellite that orbits the Earth.

As shown in FIG. 2, the GPS wristwatch 10 has an internal time display device 21 and GPS receiver 20, and components for functioning as a computer.

More particularly, the time display device 21 in this embodiment of the invention functions as an electronic timepiece. The components of the GPS wristwatch 10 shown in FIG. 2 are described below.

As shown in FIG. 2 the GPS wristwatch 10 has a bus 16. Connected to this bus 16 are a CPU (central processing unit) 17, RAM (random access memory) 18, and ROM (read-only memory) 19.

The GPS receiver 20 for receiving satellite signals transmitted from the GPS satellites 15 is also connected to the bus 16. The time display device 21 is also connected to the bus 16.

More specifically, the GPS receiver 20 includes the antenna 11, an RF unit that converts the signals received by the antenna 11 to an intermediate frequency, and a baseband unit that demodulates the received signals.

The GPS receiver 20 is more specifically a device for extracting a GPS signal from the signals received from a GPS satellite 15 in FIG. 1 by means of the antenna 11, an RF unit, and a baseband unit. The GPS receiver 20 is thus an example of a satellite signal reception unit.

The GPS signal (an example of a satellite signal) contains highly precise GPS time information (Z count) that is based on an atomic clock. The GPS signal is described further below.

The time display device 21 connected to the bus 16 has a real-time clock (RTC) 22, which is an IC device (integrated circuit device) in this aspect of the invention, and a display 27. A solar battery 23 is also connected to the bus 16 as the power supply that generates power by means of photoelectric conversion.

The RTC 22 is an example of a time information generating unit.

The bus 16 is an internal bus with addresses and data paths that function to connect all other devices. Various operating programs and information are stored in ROM 19, which is also connected to the bus 16. The CPU 17 uses RAM 18 to execute the programs and access ROM 19.

Figure 3:
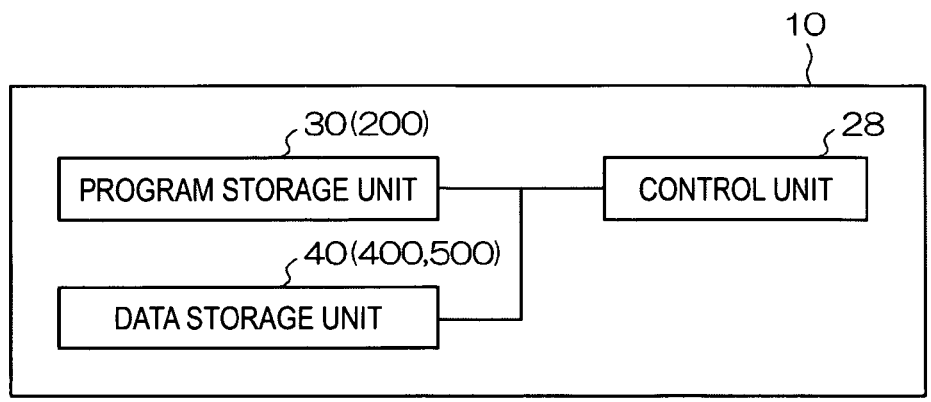
FIG. 3 is a block diagram showing the main software configuration of the wristwatch with GPS receiver.

FIG. 3 is a block diagram showing the general software configuration of the GPS wristwatch 10.

As shown in FIG. 3 the GPS wristwatch 10 has a control unit 28. The control unit 28 runs the programs stored in the program storage unit 30, and processes the data stored in the data storage unit 40.

The program storage unit 30 and data storage unit 40 are shown as discrete units in FIG. 3, but the data and programs are not actually stored separately and are simply shown this way for convenience.

Figure 4:
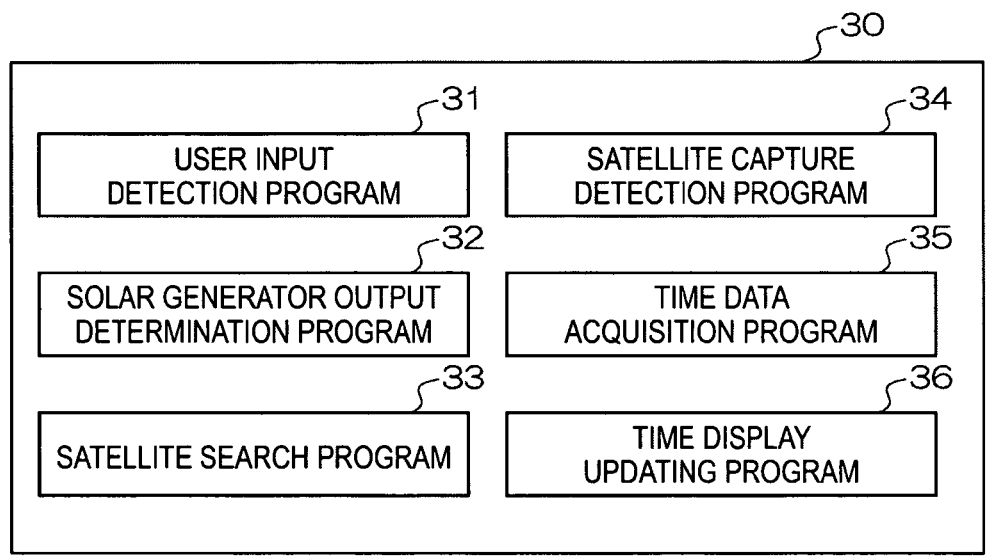
FIG. 4 is a block diagram showing the data stored in the program storage unit in FIG. 3.
Figure 5:
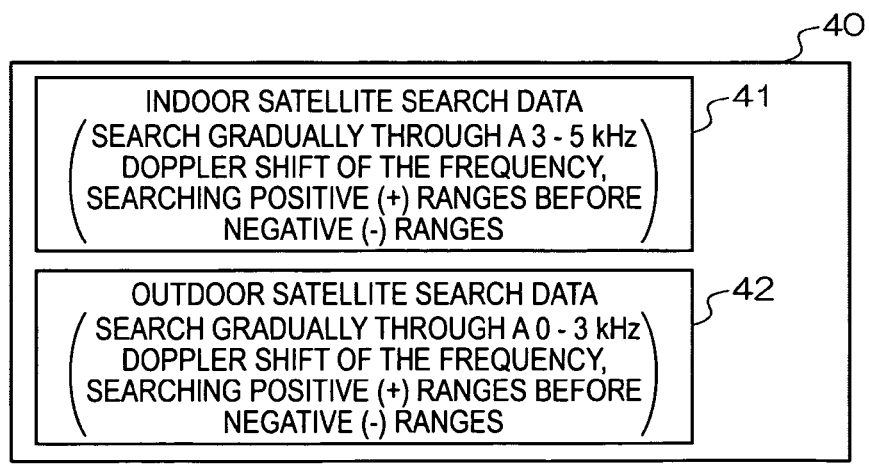
FIG. 5 is a block diagram showing the data stored in the data storage unit in FIG. 3.

FIG. 4 is a block diagram showing the data stored in the program storage unit 30 in FIG. 3. FIG. 5 is a block diagram showing data stored in the data storage unit 40 in FIG. 3.

Figure 6:
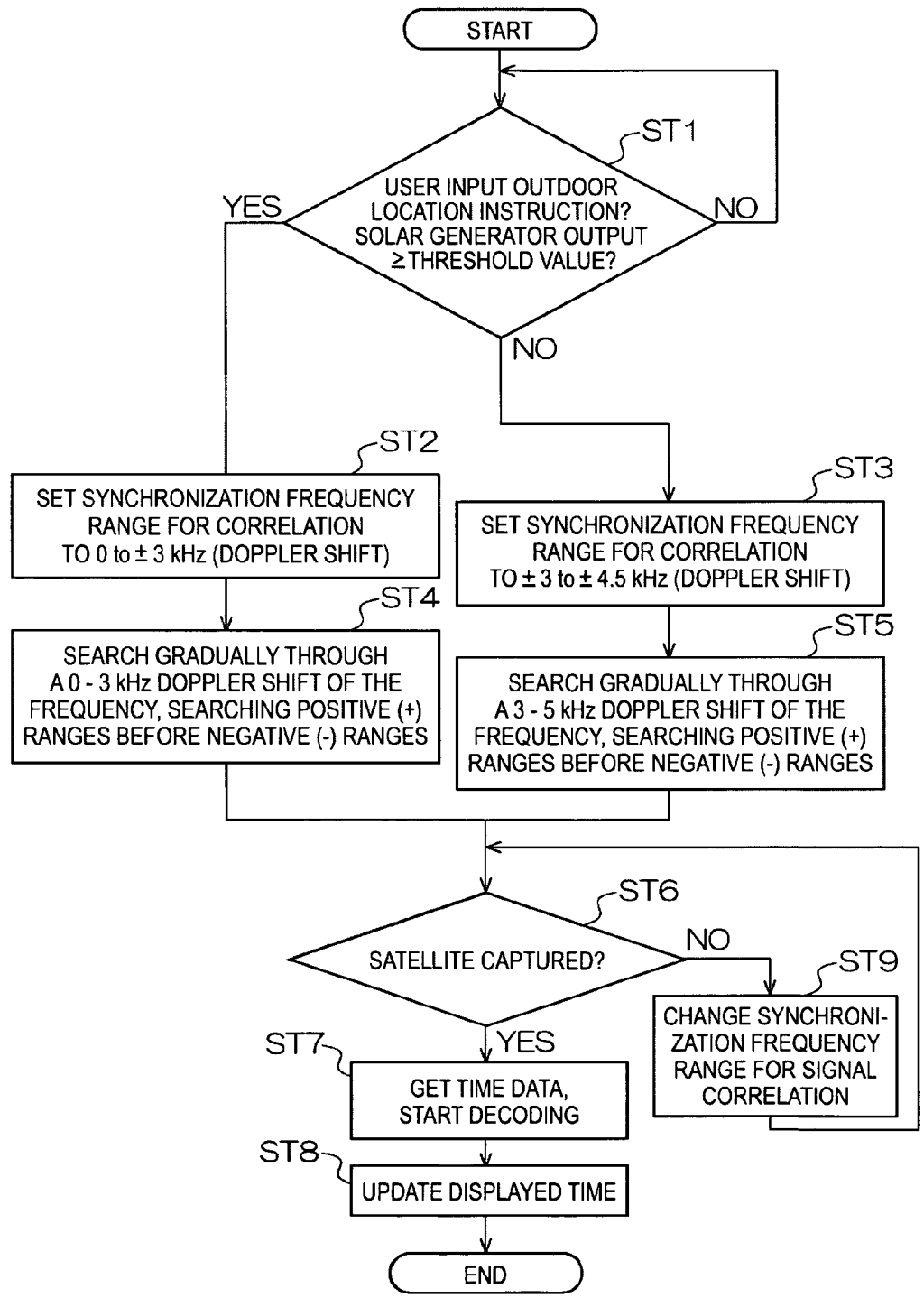
FIG. 6 is a flow chart of the operation of the wristwatch with GPS receiver according to the first embodiment of the invention.

FIG. 6 is a flow chart describing the main steps in the operation of the GPS wristwatch 10 according to this embodiment of the invention.

The GPS wristwatch 10 according to this embodiment of the invention acquires the time information contained in the satellite signal transmitted from a GPS satellite 15, and based on this time information corrects the time of the RTC 22 shown in FIG. 2. However, the GPS wristwatch 10 does not have the almanac data containing the orbit information for the GPS satellites 15. The GPS wristwatch 10 therefore does not have the location information telling when the GPS satellites 15 will be where.

A novel feature of this embodiment of the invention is that a GPS satellite 15 can be efficiently captured and the time information can be acquired without using the almanac data.

FIG. 7 schematically describes a GPS signal.

Figure 7A:
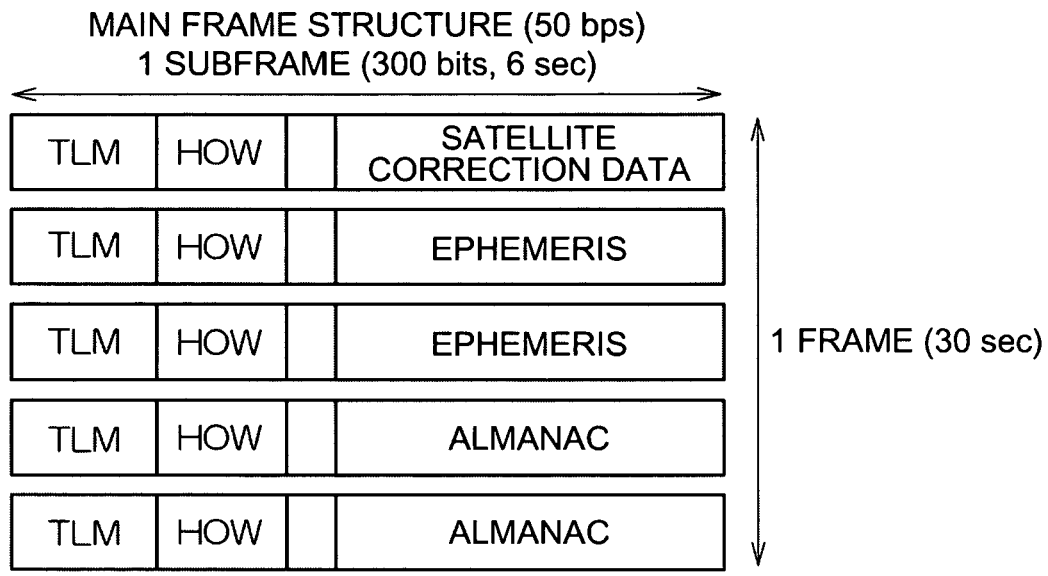
FIGS. 7A and 7B schematically show the structure of a GPS signal.

As shown in FIG. 7A, the GPS satellite 15 transmits signals in data frame units and transmits one frame every 30 seconds. Each frame consists of five subframes, and one subframe is transmitted every 6 seconds. Each subframe contains 10 words (1 word is transmitted every 0.6 second).

Figure 7B:
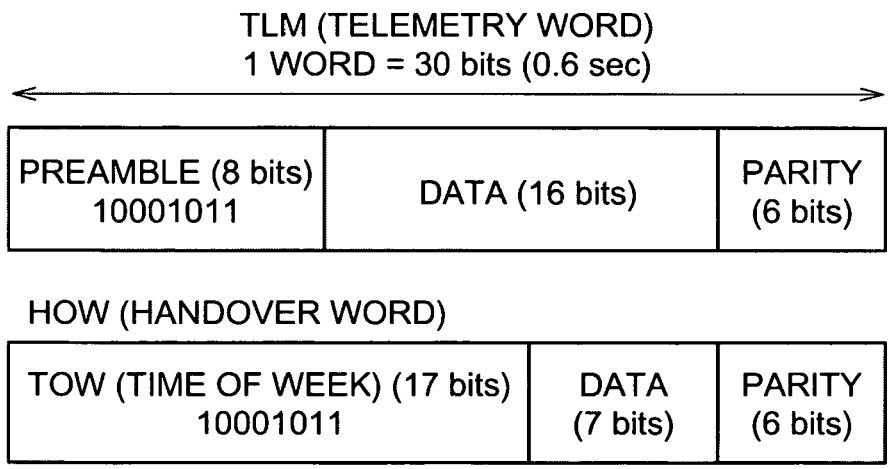

The first word in each subframe is a telemetry (TLM) word storing the TLM data, and each TLM word starts with a preamble as shown in FIG. 7B.

The TLM word is followed by a handover word HOW storing the HOW (handover word) data, and each HOW starts with the time of week (TOW) indicating the GPS time information (Z count) of the GPS satellite 15.

The Z count stores the time of the beginning of the TLM in the next subframe.

The GPS time is the number of seconds since 00:00:00 Sunday night of each week, and is reset to zero at precisely 00:00:00 every Sunday night.

The time information in this embodiment of the invention can be corrected by acquiring the TOW data (Z count), which is the GPS time information of the GPS satellite 15.

Background information that is needed to understand how the invention finds and captures a GPS satellite 15 efficiently and appropriately without using the almanac data as described is described first below. Operation of the GPS wristwatch 10 is then described with reference to the flow chart in FIG. 6.

Because the GPS wristwatch 10 of this embodiment of the invention does not use the almanac data, the GPS receiver 20 of the GPS wristwatch 10 would conventionally need to look for all GPS satellites 15 in order to capture a GPS satellite 15. In addition, the satellite signal is preferably received from a GPS satellite 15 directly above the GPS receiver 20 in order to desirably receive the satellite signal from the GPS satellite 15.

This, however, applies to a GPS wristwatch 10 that is outdoors. If the GPS wristwatch 10 is indoors, it is conversely more difficult to receive a satellite signal from a GPS satellite 15 directly overhead.

More specifically, if the GPS wristwatch 10 is indoors, the satellite signal is preferably received through a window in the building. In this case the GPS satellite 15 is not overhead but instead is located at a low angle of elevation.

This embodiment of the invention therefore defines one GPS satellite 15 search range when the GPS wristwatch 10 is outdoors, and defines another GPS satellite 15 search range when the GPS wristwatch 10 is indoors. This is described in detail below.

The GPS wristwatch 10 according to this embodiment of the invention also uses two methods to determine if the GPS wristwatch 10 is indoors or outdoors.

In one method the user of the GPS wristwatch 10 operates the input device 14 in FIG. 1 to tell the GPS wristwatch 10 whether the GPS wristwatch 10 is indoors or outdoors.

In the other method the GPS wristwatch 10 is determined to be outdoors if power output by the solar battery 23 shown in FIG. 1 reaches a certain high level. If solar battery 23 output is low, the GPS wristwatch 10 is indoors. The power output of the solar battery 23 is an example of "environment information" as used in the accompanying claims.

As described in detail below, this embodiment of the invention uses these two methods together.

The operation of the GPS wristwatch 10 is described next with reference to the flow chart in FIG. 6.

Whether the user of the GPS wristwatch 10 has input a command indicating an outdoor location is first decided in step ST1 in FIG. 6. More specifically, when the user operates the input device 14 shown in FIG. 1 and FIG. 2, an instruction indicating that the GPS wristwatch 10 is outdoors is input (also referred to as an "outdoor location instruction" below). If the input device 14 is thus operated, the user input detection program 31 in FIG. 4 runs and the GPS wristwatch 10 knows that it is located outdoors.

This embodiment of the invention is described as having the user input an outdoor location instruction as described above, but the invention is not so limited and the user could instead input an indoor location instruction or both indoor and outdoor location instructions.

Whether the output of the solar battery is greater than or equal to a predefined threshold value could be determined in step ST1 instead of determining if the user has input an outdoor location instruction. In this case the solar generator output determination program 32 shown in FIG. 4 runs to determine if the power generated by the solar battery 23 in FIG. 1 is greater than or equal to a predefined threshold value, decide that the GPS wristwatch 10 is outdoors if the generator output is greater than or equal to the threshold value, and decide that the GPS wristwatch 10 is indoors if the generator output is less than the threshold value.

The user input detection program 31 and the solar generator output determination program 32 are thus an example of an indoor/outdoor determination unit.

If in step ST1 the user has input an outdoor location instruction or if the solar power generator output is greater than or equal to the threshold value, the GPS wristwatch 10 is known to be outdoors and control goes to step ST2.

In step ST2 the synchronization frequency range for signal correlation is set to a Doppler shift of 0 kHz to ±3 kHz.

Doppler shift is described briefly next. The Doppler shift is basically based on the Doppler effect, that is, the apparent frequency of the satellite signal varying according to the radial speed of the signal source (GPS satellite 15) to the observer (GPS wristwatch 10). The Doppler effect causes the apparent frequency to increase as the satellite signal source moves closer to the receiver, and decrease as the signal source moves farther from the receiver.

This relationship expressed as the difference (deviation) from the theoretical frequency of the satellite signal is the Doppler shift (stated in kHz).

Figure 8:
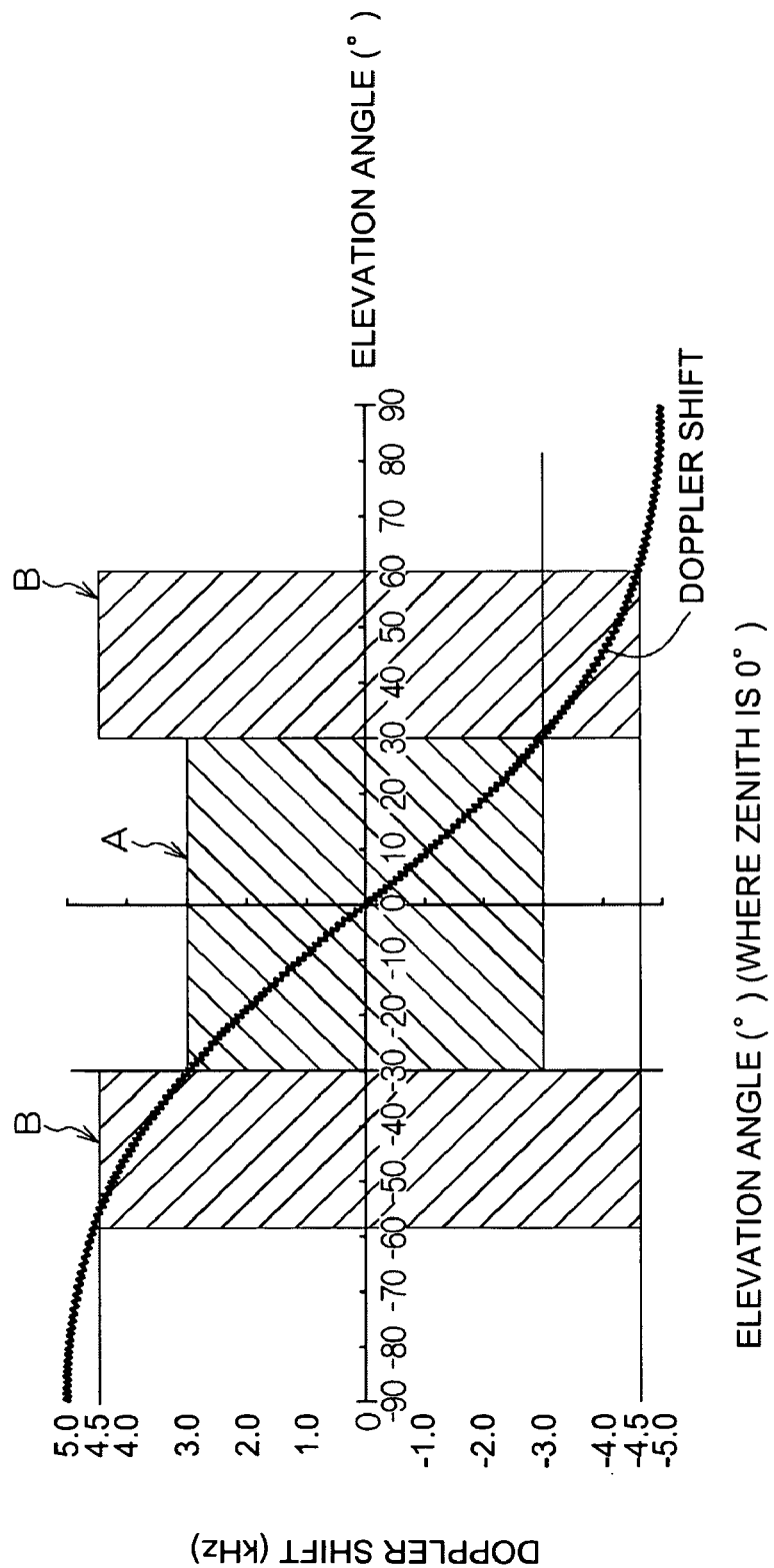
FIG. 8 shows the relationship between Doppler shift, the GPS satellite elevation angle, and distance.

FIG. 8 shows the relationship between Doppler shift and the elevation angle of and distance to the GPS satellite 15.

Doppler shift is shown on the y-axis in FIG. 8, and the elevation angle of the GPS satellite 15 is shown on the x-axis. More specifically, because the GPS satellite 15 is moving, the GPS satellite 15 travels from the left side of the graph to the right side. More particularly, the GPS satellite 15 is at an elevation angle of −90° in FIG. 8 when the GPS satellite 15 appears to be at the horizon as seen from the location of the GPS wristwatch 10. The GPS satellite 15 then gradually approaches the zenith directly above the GPS wristwatch 10 where the elevation angle goes to 0°. As the GPS satellite 15 then continues moving away from the zenith and approaches the opposite horizon, the elevation angle goes to +90°.

As the GPS satellite 15 moves from an elevation angle of −90° to an elevation angle of +90° as shown on the x-axis in FIG. 8, the Doppler shift (kHz) shown on the y-axis also changes. More specifically, while the Doppler shift is 5 kHz at an elevation angle of −90°, the Doppler shift goes to 0 kHz at an elevation angle of 0°, and then goes to −5 kHz at an elevation angle of −90°.

The elevation angle of the GPS satellite 15 can thus be determined from the Doppler shift (kHz) of the satellite signal received from the GPS satellite 15.

Yet more specifically, a GPS wristwatch 10 according to this embodiment of the invention can suitably determine the position of the GPS satellite 15 from the Doppler shift without referring to the almanac data describing the orbits of all of GPS satellites 15 in the constellation.

Referring again to step ST2 in FIG. 6, step ST2 is set to search for GPS satellites 15 in the Doppler shift range of 0 kHz to 3 kHz. This corresponds to an elevation angle of 0°±30° as will be known from FIG. 8. This is a high elevation angle range centered on the zenith.

Because step ST2 is invoked when the GPS wristwatch 10 is outdoors, the search range is set to a high elevation angle range where the satellite signals are easiest to receive. Control then goes to step ST4.

However, if the outdoor location instruction is not input by the user in step ST1 or if the solar power generator output is less than the threshold value, the GPS wristwatch 10 is determined to be indoors and control therefore goes from step ST1 to step ST3. In step ST3 the Doppler shift (kHz) range for the GPS satellite 15 search is set to +3 kHz to +4.5 kHz and to −3 kHz to −4.5 kHz. As shown in FIG. 8 this corresponds to an elevation angle range of −60° to −30° and +30° to +60°.

More specifically, because the GPS wristwatch 10 is indoors if step ST3 runs, satellite signals from GPS satellites 15 located in the high elevation angle range centered on the zenith cannot be received.

The search range for GPS satellites 15 is therefore set to an elevation angle range, specifically the ranges of −60° to −30° and +30° to +60°, where an opening such as a window can be expected. Control then goes to step ST5.

Step ST4 is described next. Step ST4 determines the order in which the GPS receiver 20 shown in FIG. 1 searches for the GPS satellites 15 when located outdoors. More particularly, the GPS receiver 20 searches for satellites through the Doppler shift range of 0 kHz to 3 kHz, searching first through the range from 0 to +3 kHz and then the range from 0 to −3 kHz.

The satellite search program 33 in FIG. 4 therefore runs based on the outdoor satellite search data 42 shown in FIG. 5. The outdoor satellite search data 42 includes the search range and the search method. The outdoor satellite search data 42 is an example of outdoor reception range information.

As shown in FIG. 8, the shaded area indicated by arrow A in FIG. 8 indicates the search range data stored in the outdoor satellite search data 42, and the GPS receiver 20 in FIG. 1 searches for a satellite in this angular range. The satellite search sequence is sequential from the zenith (0 kHz) to 3 kHz, and preferably searches the positive angular range (from 0 kHz Doppler shift up) first and then the negative angular range (from 0 kHz Doppler shift down).

Figure 9:
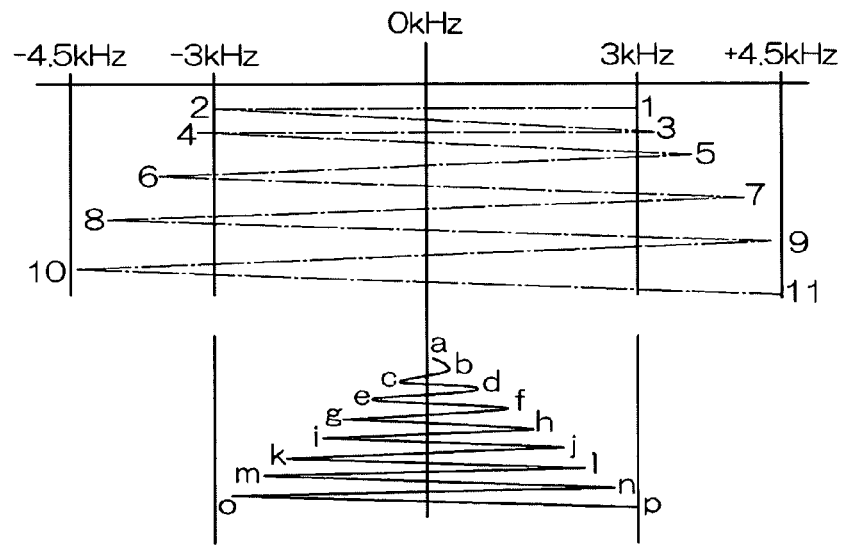
FIG. 9 schematically shows the satellite search sequence.

FIG. 9 illustrates the satellite search sequence. Indices a to p in FIG. 9 indicate the satellite search sequence during an outdoor search.

As shown in FIG. 9 the search starts from domain a near the zenith and proceeds through the positive (+kHz) Doppler shift range, that is, the range where a GPS satellite 15 approaching the GPS wristwatch 10 may be located. The negative (−kHz) Doppler shift range, that is, the range where a GPS satellite 15 moving away from the GPS wristwatch 10 may be located, is then searched. Both satellite ranges can thus be efficiently searched for satellites.

Step ST5 is described next. Step ST5 determines the order in which the GPS receiver 20 shown in FIG. 1 searches for the GPS satellites 15 when located indoors. More particularly, the GPS receiver 20 searches for satellites through the Doppler shift range of 3 kHz to 4.5 kHz, searching first through the range from +3 kHz to +4.5 kHz and then the range from −3 kHz to −4.5 kHz.

The satellite search program 33 in FIG. 4 therefore runs based on the indoor satellite search data 41 shown in FIG. 5. The indoor satellite search data 41 includes the search range and the search method. The indoor satellite search data 41 is an example of indoor reception range information.

As shown in FIG. 8, the shaded area indicated by arrow B in FIG. 8 indicates the search range data stored in the indoor satellite search data 41, and the GPS receiver 20 in FIG. 1 searches for a satellite in this angular range. The satellite search sequence is sequential from 3 kHz (an elevation angle of 30°) to 4.5 kHz (an elevation angle of 60°), and preferably searches the positive angular range (greater than 0 kHz) first and then the negative angular range (less than 0 kHz).

FIG. 9 illustrates the satellite search sequence. Indices 1 to 11 in FIG. 9 indicate the satellite search sequence during an indoor search.

As shown in FIG. 9 the search starts from Doppler shift range 1 at +3 kHz (an elevation angle of 30°) and proceeds through range 2 to −3 kHz. As indicated by indices 3 to 11 in FIG. 9, searching continues while alternating between positive and negative Doppler shift ranges, that is, search ranges where a GPS satellite 15 approaching the GPS wristwatch 10 may be located and search ranges where a GPS satellite 15 moving away from the GPS wristwatch 10 may be located. Both satellite ranges can thus be efficiently searched for satellites.

The satellite search program 33 is an example of a positioning information satellite selection unit, and Doppler shift is an example of information about the satellite signal deviation from the transmission frequency and information about the difference from the theoretical transmission frequency.

Because the satellite search program 33 thus searches preferentially for GPS satellites 15 with a low Doppler shift value, this is also an example of a configuration whereby the positioning information satellite selection unit preferentially selects a positioning information satellite from which signals can be received at a frequency with little deviation from the theoretical transmission frequency.

A positive Doppler shift (+kHz) is an example of approaching frequency difference information, and a negative Doppler shift (−kHz) is an example of receding frequency difference information.

After the satellite search in step ST4 or ST5, control goes to step ST6. In step ST6 the satellite capture detection program 34 in FIG. 4 runs and terminates the search if a GPS satellite 15 is captured by searching range a-p or range 1-11 in FIG. 9.

More particularly, because steps ST4 and ST5 search for satellites in the preferred satellite signal reception order, a successfully captured satellite will be a GPS satellite 15 in the most desirable location under the current conditions.

Yet more particularly, because steps ST4 and ST5 preferentially select a GPS satellite 15 at the highest elevation angle in the satellite search data range shown in FIG. 5, the captured satellite signal will be appropriately easy to receive under the current conditions.

If step ST6 determines that at least one GPS satellite 15 was captured, control goes to step ST7. The TOW word (time data) shown in FIG. 7 of the satellite signal from the captured GPS satellite 15 is then received and decoded to acquire the Z count. This is done by the time data acquisition program 35 shown in FIG. 4 (an example of a satellite signal reception step).

Step ST7 can thus acquire a correct, accurate GPS time (Z count), and control then goes to step ST8.

In step ST8 the time display updating program 36 in FIG. 4 runs, the time kept by the RTC 22 in FIG. 2 is corrected, and the time displayed by the timepiece in FIG. 1 is adjusted (an example of a time information adjustment step).

The TOW is thus an example of satellite time information, and the time display updating program 36 is an example of a time information adjustment unit.

If step ST6 determines that a GPS satellite 15 could not be captured, control goes to step ST9, the synchronization frequency range is changed to a different range, and step ST6 repeats. For example, if the synchronization frequency range is 0 kHz to ±3 kHz in step ST2 and a GPS satellite 15 could not be captured, the search range is changed to ±3 kHz to ±4.5 kHz. Conversely, if the synchronization frequency range is ±3 kHz to ±4.5 kHz in step ST3 and a GPS satellite 15 could not be captured, the search range is changed to 0 kHz to ±3 kHz. This enables reliably capturing a satellite.

This embodiment of the invention thus enables the GPS wristwatch 10 to suitably select the most appropriate GPS satellite 15 and adjust the time without acquiring or updating the almanac data containing orbit information for all GPS satellites 15, and can thus reduce power consumption.

Embodiment 2

Figure 10:
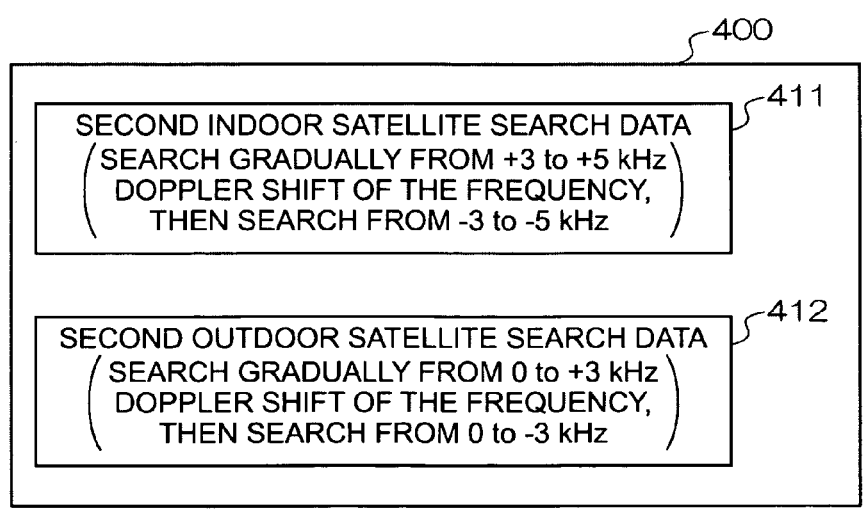
FIG. 10 is a block diagram of the main internal software configuration of the wristwatch with a GPS time adjustment device as an example of a timekeeping device with a time adjustment device according to a second embodiment of the invention.
Figure 11:
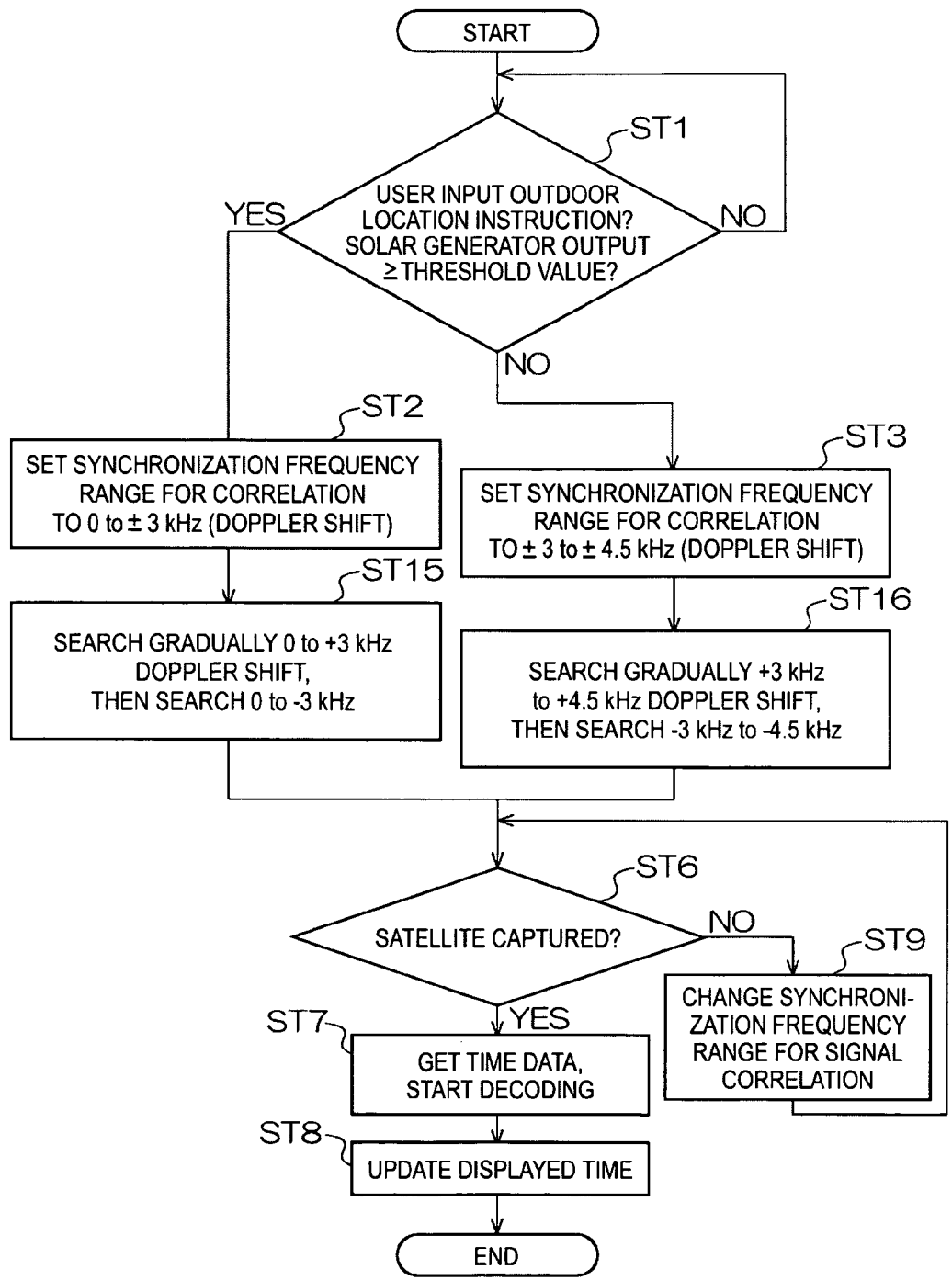
FIG. 11 is a flow chart of the operation of the wristwatch with a GPS time adjustment device according to a second embodiment of the invention.

FIG. 10 is a block diagram of the main internal software configuration of the wristwatch with a GPS time adjustment device 100 ("GPS wristwatch 100" below) as an example of a timekeeping device with a time adjustment device according to a second embodiment of the invention. FIG. 11 is a flow chart of the operation of the GPS wristwatch 100 according to the second embodiment of the invention.

More particularly, FIG. 10 schematically shows the data stored in the data storage unit 400 in this embodiment of the invention.

The configuration of the GPS wristwatch 100 according to this embodiment of the invention has many parts in common with the GPS wristwatch 10 described in the first embodiment, like parts are therefore identified by the same reference numerals, and the differences therebetween are described below.

The main difference between this embodiment and the first embodiment described above is in steps ST15 and ST16 shown in the flow chart in FIG. 11. Some essential background information is described first below before describing these steps, however.

Figure 12:
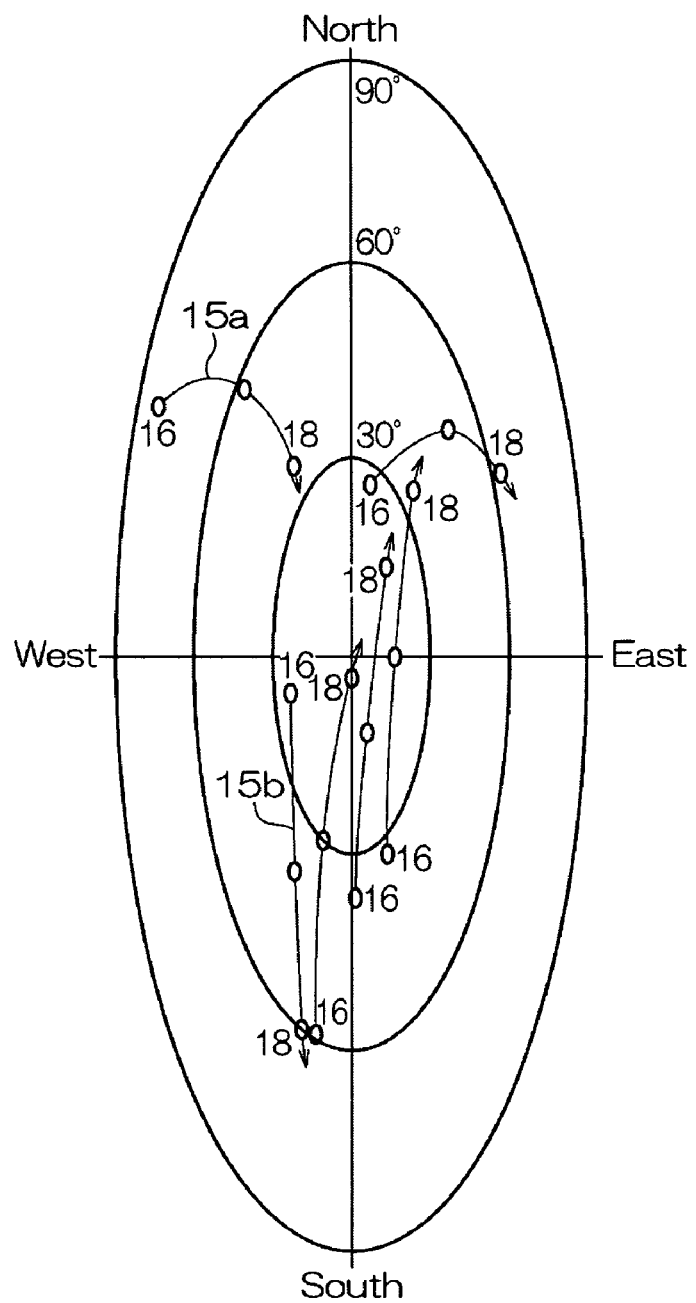
FIG. 12 schematically shows the satellite orbit history of a GPS satellite.

FIG. 12 schematically describes the satellite orbit history of a GPS satellite. The outside and largest of the ellipses shown in FIG. 12 corresponds to a 90° elevation angle shown in FIG. 8, the middle ellipse corresponds to a 60° elevation angle, and the smallest ellipse corresponds to a 30° elevation angle. The elevation angle at the origin is 0°, indicating the satellite is at the zenith.

The satellite orbit histories shown in FIG. 12 describe the movement of the GPS satellites 15 from one elevation angle range to another.

More specifically, reference numeral 15a in FIG. 12 denotes GPS satellite (1). At 16:00 hours this GPS satellite (1) 15a is located at a position between an elevation angle of 60° to 90°, but then moves toward the zenith and at 18:00 hours has moved to a position near an elevation angle of 30°. This GPS satellite (1) 15a therefore has a positive (+kHz) Doppler shift.

Reference numeral 15b in FIG. 12 denotes GPS satellite (2). At 16:00 hours this GPS satellite (2) 15b is located at a position near an elevation angle of 30°, but then moves to a position at an elevation angle of 60° at 18:00 hours. This GPS satellite (2) 15b therefore has a negative (−kHz) Doppler shift.

The GPS satellites 15 orbiting the Earth are thus not all on the same orbit, and in order to receive the satellite signal the GPS wristwatch 10 preferably receives a satellite signal from a GPS satellite 15 with a positive (+kHz) Doppler shift, that is, a GPS satellite 15 that is moving towards the zenith.

When the GPS wristwatch 10 is outdoors, the satellite search program 33 therefore first searches for a GPS satellite 15 in the positive (+) Doppler shift range (that is, a GPS satellite 15 moving toward the zenith), and then searches for a GPS satellite 15 in the negative (−) Doppler shift range (that is, a GPS satellite 15 moving away from the zenith) as shown in step ST15 in FIG. 11.

More specifically, the satellite search program 33 reads the second outdoor satellite search data 412 shown in FIG. 10, sequentially searches through the Doppler shift range from 0 to +3 kHz, and then searches through the Doppler shift range from 0 to −3 kHz.

As shown in FIG. 9, the satellite search program 33 therefore searches for a satellite in the positive (+) ranges a, b, d, f, h, j, l, n, p, and then searches in the negative (−) ranges c, e, g, i, k, m, o.

By searching this way the GPS wristwatch 100 first looks for a GPS satellite 15 that is moving toward the zenith, which is preferable for reception, thereby enabling capturing a satellite more quickly and quickly adjusting the time.

As shown in step ST16 in FIG. 11, if the GPS wristwatch 100 is indoors, the satellite search program 33 searches for a GPS satellite 15 in Doppler shift range from 3 kHz to 4.5 kHz starting on the positive (+).

More specifically, the satellite search program 33 reads the second indoor satellite search data 411 shown in FIG. 10 to get the Doppler shift search ranges.

As shown in FIG. 9, the satellite search program 33 therefore searches for a satellite in the positive (+) ranges 1, 3, 5, 7, 9, 11, and then searches in the negative (-) ranges 2, 4, 6, 8, 10.

The satellite search program 33, the second outdoor satellite search data 412, and the second indoor satellite search data 411 are an example of positioning information satellite selection unit that scans for a receivable frequency with preference to approaching frequency difference information over receding frequency difference information.

Embodiment 3

Figure 13:
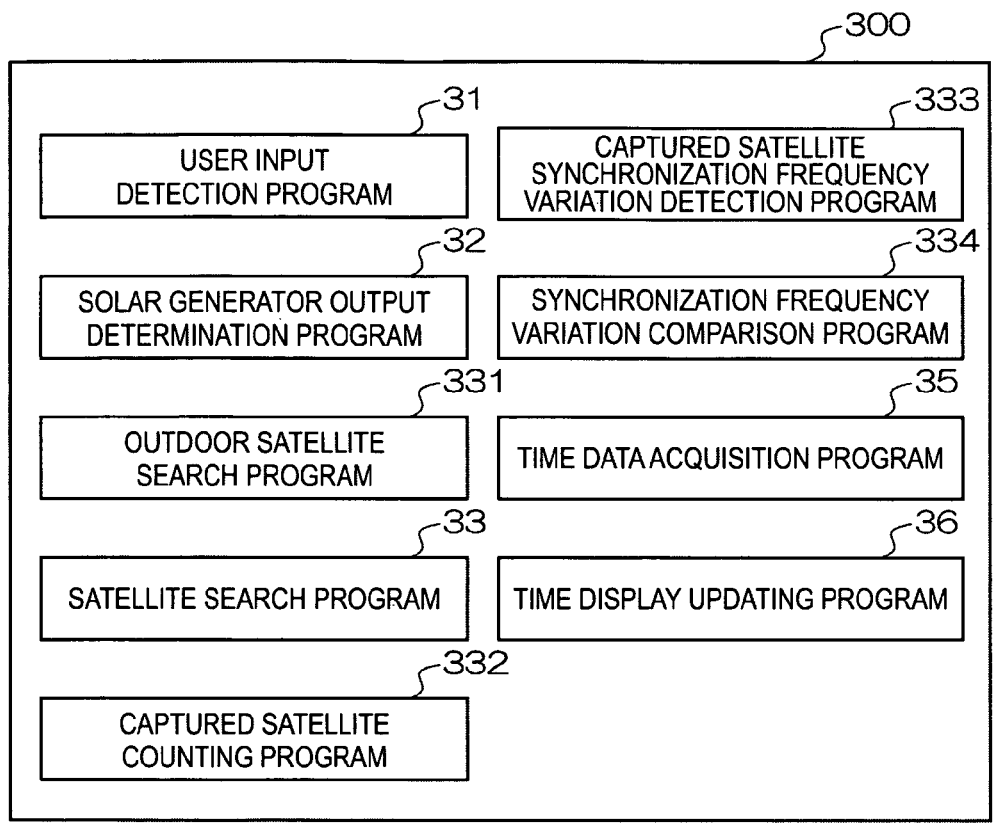
FIG. 13 is a block diagram of the main internal software configuration of the wristwatch with a GPS time adjustment device as an example of a timekeeping device with a time adjustment device according to a third embodiment of the invention.
Figure 14:
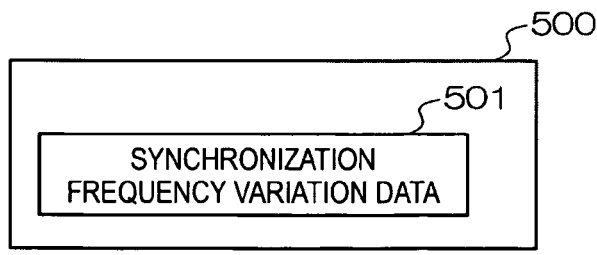
FIG. 14 is another block diagram of the main internal software configuration of the wristwatch with a GPS time adjustment device as an example of a timekeeping device with a time adjustment device according to a third embodiment of the invention.
Figure 15:
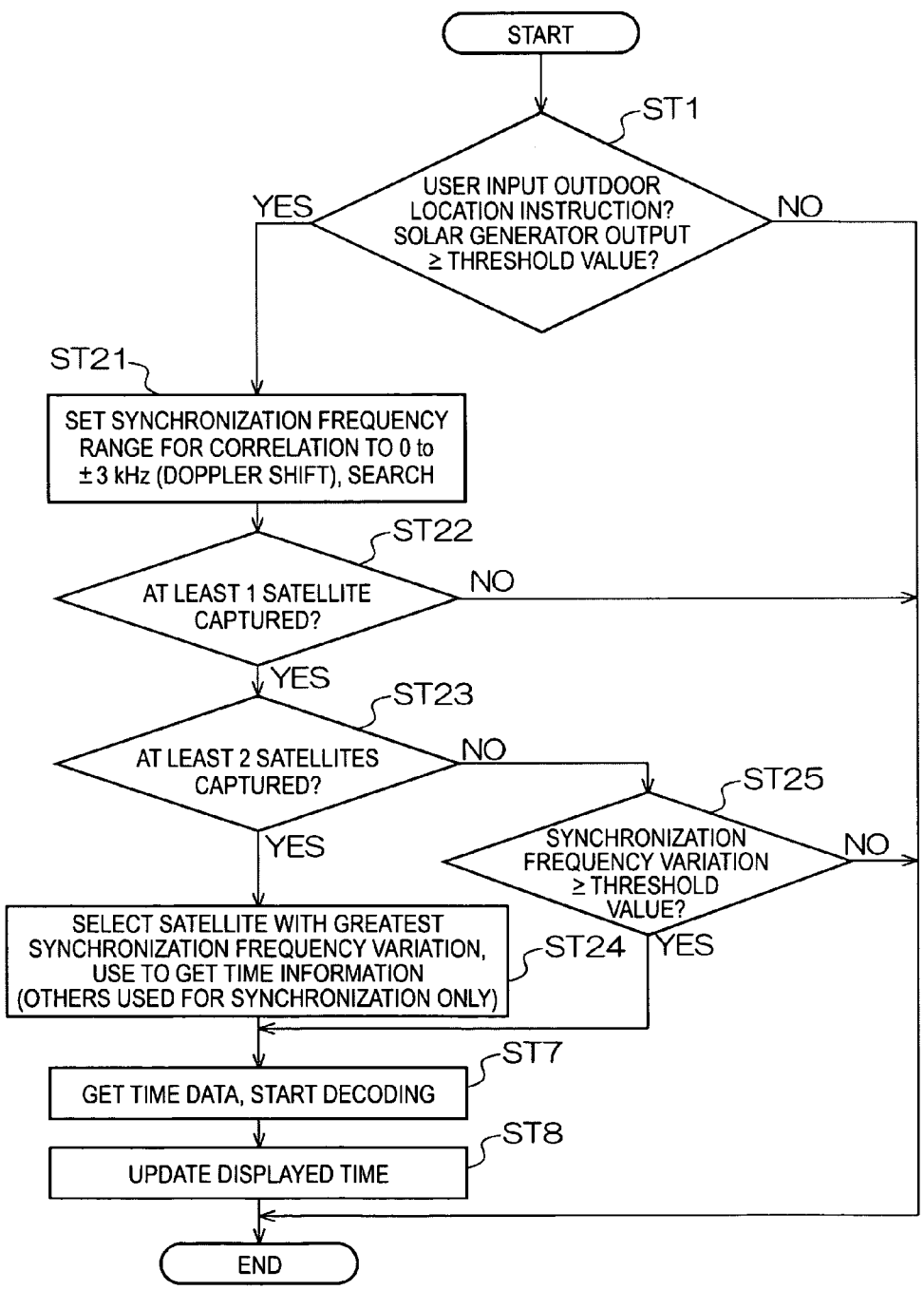
FIG. 15 is a flow chart of the operation of the wristwatch with GPS time adjustment device according to a third embodiment of the invention.

FIG. 13 and FIG. 14 are block diagrams showing the main internal software configuration of a wristwatch with a GPS time adjustment device 200 (GPS wristwatch 200 below) described below as an example of a timekeeping device with a time adjustment device according to this third embodiment of the invention. FIG. 15 is a flow chart describing the main steps in the operation of the wristwatch with a GPS wristwatch 200 according to this embodiment of the invention.

More specifically, FIG. 13 shows the data stored in the program storage unit 300 in this embodiment of the invention, and FIG. 14 shows the data stored in the data storage unit 500 in this embodiment of the invention.

The configuration of the wristwatch with GPS wristwatch 200 according to this embodiment of the invention has many parts in common with the GPS wristwatch 10 described in the first embodiment, like parts are therefore identified by the same reference numerals, and the differences therebetween are described below.

In order to determine the position of a GPS satellite 15, this embodiment of the invention detects the Doppler shift (kHz) of the received signal as shown in FIG. 8. Because the Doppler shift is the difference between the theoretical frequency of the satellite signal and the apparent frequency, this difference frequency can be determined independently by the GPS wristwatch 200.

Because the GPS wristwatch 200 has a RTC 22 it also has an oscillation circuit not shown and operates referenced to the oscillator output. The oscillator is, however, easily affected by temperature changes, for example, which causes the output frequency of the oscillation circuit to vary, producing frequency drift that can introduce error to the output frequency.

If this frequency drift is approximately 2 ppm when the Doppler shift (kHz) is determined from the satellite signal of the GPS satellite 15, there will be an actual shift of about 3 kHz which is equal to an elevation angle deviation of approximately 30°.

Using the first embodiment by way of example, if the GPS wristwatch 10 is outdoors and the satellite signal search is run in the Doppler shift range from 0 to ±3 kHz, the range that is actually searched will be shifted approximately 3 kHz.

Figure 16:
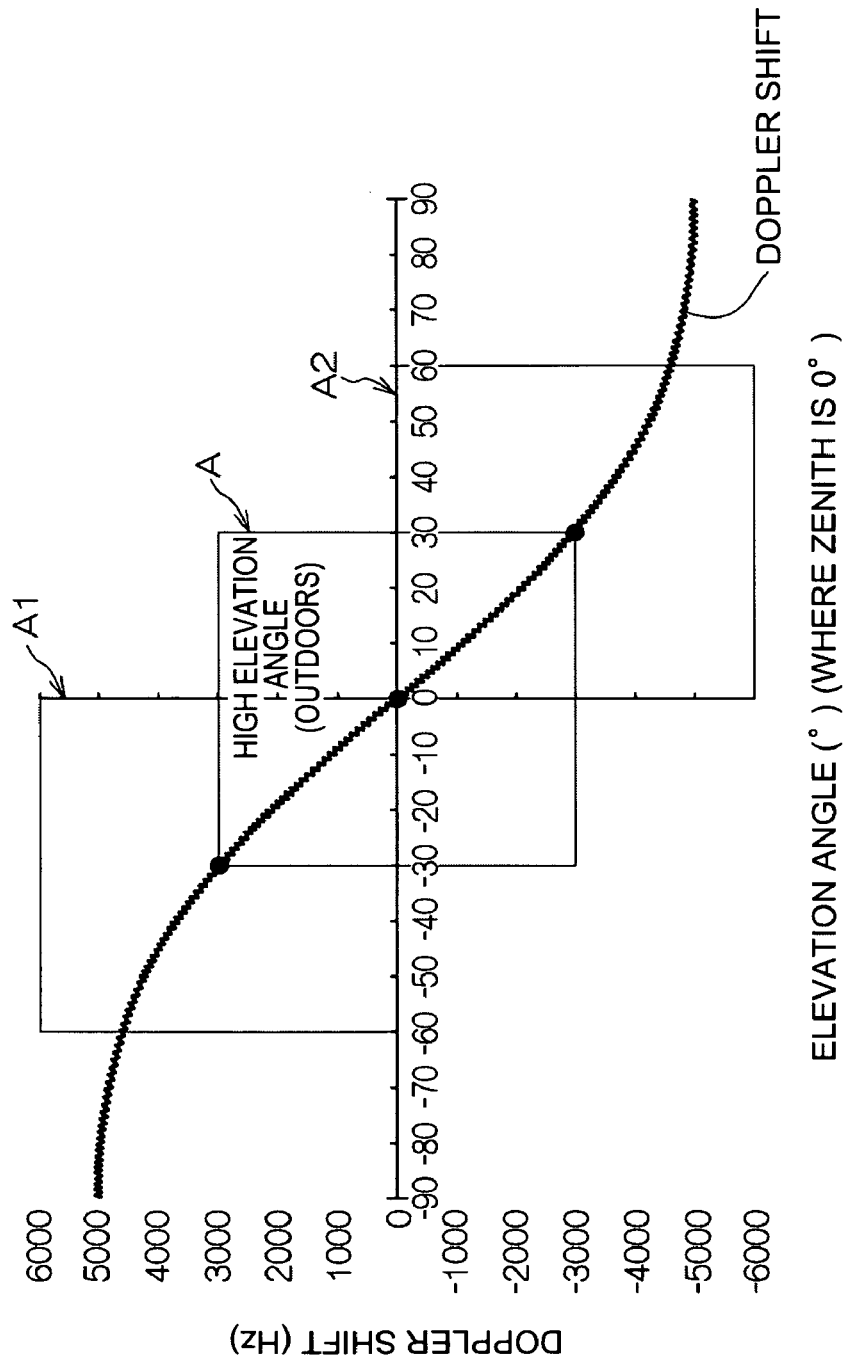
FIG. 16 is a graph describing the effect of frequency drift.

This is described further with reference to the graph describing the effect of frequency shift in FIG. 16. The range A shown in FIG. 16 corresponds to range A in FIG. 8. If the frequency drift described above is on the positive (+) side, the range actually searched will be range A1 in FIG. 16. As shown in FIG. 16 the area that is searched for a satellite is therefore shifted by an elevation angle of 30° to the positive (+) side.

Area A2 in FIG. 16 indicates the search range when the area A in FIG. 18 is similarly shifted to the negative (-) side.

This means that while the range from 0° (zenith) ±3 kHz should be searched when outdoors, the range that is actually searched is from 0 to +6 kHz or 0 to -6 kHz.

Referring to FIG. 12, this could result in a GPS satellite 15a (shifted to the positive (+) side) or GPS satellite 15b (shifted to the negative (-) side) located in the range from a 30° to 60° elevation angle being selected as the GPS satellite 15 suitable for signal reception even though the range of elevation angles searched was from 0° to 30°.

The GPS wristwatch 200 according to this embodiment of the invention therefore executes the steps shown in FIG. 15 in order to correctly select a GPS satellite 15 in the intended elevation angle range even if such frequency drift occurs.

To simplify the following description of the steps in FIG. 15, the GPS wristwatch 200 is assumed to be outdoors.

Then in step ST21 in FIG. 15 the Doppler shift range is set to 0 kHz to 3 kHz as the synchronization frequency range for signal correlation. Frequency drift has also already occurred in the GPS wristwatch 200, and the synchronization frequency range is offset to either area A1 or A2 in FIG. 16.

The outdoor satellite search program 331 in FIG. 13 therefore runs in step ST21 and searches for a satellite. This operation is the same as the satellite search program 33 in FIG. 4 referencing the outdoor satellite search data 42 in FIG. 5 to search for a satellite as described above.

Step ST22 then decides if one or more GPS satellites 15 were captured, and step ST23 decides if two or more GPS satellites 15 were captured. If step ST22 decides that a GPS satellite 15 was not captured, operation ends.

More specifically, the captured satellite counting program 332 in FIG. 13 runs and determines the number of captured GPS satellites 15.

If step ST23 determines that two or more GPS satellites 15 were captured, control goes to step ST24. Of the satellite signals from the captured GPS satellites 15, the satellite with the highest synchronization frequency variation is selected in step ST24.

This synchronization frequency variation is different from the Doppler shift described above, and instead indicates the variation in the Doppler shift. FIG. 16 is a graph showing the variation in the Doppler shift of the GPS satellites 15. As shown in FIG. 16, the change in this curve is smallest where the elevation angle is low, and increases as the elevation angle increases and the satellite approaches the zenith.

More specifically, data on the size of the change in the Doppler shift of each GPS satellite 15 is acquired, and the GPS satellite 15 nearest the zenith can be selected by selecting a GPS satellite 15 with a large variation in the Doppler shift.

By thus selecting a GPS satellite 15 based on the change in the Doppler shift, a GPS satellite 15 that is nearest the zenith within the selected search range can be chosen even when there is internal frequency drift, and the satellite signal can therefore be efficiently received.

The synchronization frequency variation comparison program 334 in FIG. 13 is run for this operation.

If step ST23 decides that two or more GPS satellites 15 could not be captured, control goes to step ST25. Unlike in step ST24, change in the Doppler shift cannot be compared in this case. The change in the Doppler shift, which is the synchronization frequency variation, when the elevation angle is high is therefore predefined and used for comparison to determine if the captured satellite is suitable for signal reception.

The predefined values for Doppler shift variation for high elevation angles are stored in the synchronization frequency variation data 501 in FIG. 14, referenced by the captured satellite synchronization frequency variation detection program 333 in FIG. 13, and compared with the variation in the Doppler shift of the satellite signal from the captured GPS satellite 15.

If the variation in the Doppler shift of the satellite signal from the captured GPS satellite 15 is greater than the synchronization frequency variation data 501 in FIG. 14, the time information is acquired from the satellite signal because the GPS satellite 15 is determined to be at a high angle of elevation, and the time is then corrected as shown in step ST7 and step ST8.

If the variation input terminal the Doppler shift of the satellite signal from the captured GPS satellite 15 is less than the synchronization frequency variation data 501 in FIG. 14, operation ends.

If frequency drift has occurred in the GPS wristwatch 200 and error is therefore introduced to the satellite search referenced to the Doppler shift as described above, this embodiment of the invention compensates for the frequency drift to select an appropriate GPS satellite 15.

Note that the synchronization frequency variation as used herein is an example of the frequency variation cited in the accompanying claims.

The invention is not limited to the embodiments described above. The foregoing embodiments are described using GPS satellites that orbit the Earth as an example of a positioning information satellite. However, the positioning information satellite of the invention is not so limited, and includes geostationary satellites and quasi-zenith satellites, for example.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A time adjustment device comprising:
    a satellite signal reception unit that receives satellite signals containing satellite time information transmitted from a positioning information satellite;
    a time information generating unit that generates time information; and
    a time information adjustment unit that adjusts the time information based on the satellite time information received by the satellite signal reception unit;
    an indoor/outdoor determination unit that decides if the time adjustment device is indoors or outdoors based on the power generated by photoelectric conversion;
    a reception range information storage unit that stores reception range information defining the reception range for receiving positioning information satellite signals based on a difference in time adjustment device environment information, the reception range information including indoor reception range information defining the frequency range to scan when the time adjustment device is indoors, and outdoor reception range information defining the frequency range to scan when the time adjustment device is outdoors; and
    a positioning information satellite selection unit that selects the positioning information satellite from which the satellite time information is received based on variation in the transmission frequency of the satellite signals transmitted from the positioning information satellite and the reception range information.

2. The time adjustment device described in claim 1, wherein:
    the variation in the transmission frequency is theoretical transmission frequency difference information; and
    the positioning information satellite selection unit preferentially selects a positioning information satellite for which the difference to the theoretical value of the transmission frequency is the smallest.

3. The time adjustment device described in claim 2, wherein:
    the theoretical transmission frequency difference information includes approaching frequency difference information for positioning information satellites that are moving closer to and receding frequency difference information for positioning information satellites that are moving away from the time adjustment device; and
    the positioning information satellite selection unit scans for satellite signals by alternating between the approaching frequency difference information and the receding frequency difference information and/or with preference for the approaching frequency difference information over the receding frequency difference information.

4. The time adjustment device described in claim 1, wherein:
    the variation in the transmission frequency is the size of the frequency variation; and
    the positioning information satellite selection unit preferentially selects a positioning information satellite for which the frequency variation is the greatest.

5. A timekeeping device with a time adjustment device, comprising:
    a satellite signal reception unit that receives satellite signals containing satellite time information transmitted from a positioning information satellite;
    a time information generating unit that generates time information; and
    a time information adjustment unit that adjusts the time information based on the satellite time information received by the satellite signal reception unit;
    an indoor/outdoor determination unit that decides if the time adjustment device is indoors or outdoors based on the power generated by photoelectric conversion;
    a reception range information storage unit that stores reception range information defining the reception range for receiving positioning information satellite signals based on a difference in time adjustment device environment information, the reception range information including indoor reception range information defining the frequency range to scan when the time adjustment device is indoors, and outdoor reception range information defining the frequency range to scan when the time adjustment device is outdoors; and
    a positioning information satellite selection unit that selects the positioning information satellite from which the satellite time information is received based on variation in the transmission frequency of the satellite signals transmitted from the positioning information satellite and the reception range information.

* * * * *